United States Patent [19]

Anderson et al.

[11] Patent Number: 4,923,299

[45] Date of Patent: May 8, 1990

[54] OPTICALLY DIFFERENTIATING AND ADDING PASSIVE RING LASER GYROSCOPE

[75] Inventors: Dana Z. Anderson; Nicholas Sampas, both of Boulder, Colo.

[73] Assignee: University of Colorado Foundation, Inc., Boulder, Colo.

[21] Appl. No.: 230,020

[22] Filed: Aug. 9, 1988

[51] Int. Cl.$^5$ .............................................. G01C 19/64
[52] U.S. Cl. .................................................... 356/350
[58] Field of Search ........................... 356/350; 372/94

[56] References Cited

U.S. PATENT DOCUMENTS 4,135,822 1/1979 Ezediel .
4,700,150 10/1987 Hall et al. .

OTHER PUBLICATIONS

S. Ezekiel and S. R. Balsamo, "Passive Ring Resonator Laser Gyroscope", *Applied Physics Letters,* vol. 30, No. 9, p. 478 (1977).
G. A. Sanders, M. G. Prentiss, and S. Ezekiel, "Passive Ring Resonator Method for Sensitive Inertial Rotation Measurements in Geophysics and Relativity", *Optics Letters,* vol. 6, No. 11, p. 569 (1981).
L. F. Stokes, M. Chodorow and H. J. Shaw, "All-Single-Mode Fiber Resonator", *Optics Letters,* vol. 7, p. 288 (1982).
R. W. P. Drever, J. L. Hall, F. V. Kowalski, J. Hough, G. M. Ford, A. J. Munley, and H. Ward, "Laser Phase and Frequency Stabilization Using an Optical Resonator", *Applied Physics B,* vol. 31, p. 97 (1983).
R. E. Meyer, S. Ezekiel, D. W. Stowe, and V. J. Tekippe, "Passive Fiber-Optic Resonator for Rotation Sensing", *Optics Letters,* vol. 8, p. 644 (1983).
F. Zarinetchi and S. Ezekiel, "Observation of Lock-In Behavior in a Passive Ring Laser Gyroscope", *Optics Letters,* vol. 11, p. 401 (1986).
G. A. Pavlath, "Inertial Grade Fiber Gyros", The Institute of Navigation, Proceedings of the National Technical Meeting, Santa Barbara, California, Jan. 26-29, 1988.
M. M. Tehrani and J. A. Hoschette, "The Passive Cavity Gyro", Honeywell Systems and Research Center, Minneapolis, Minnesota.

Primary Examiner—Vincent P. McGraw
Assistant Examiner—S. A. Turner
Attorney, Agent, or Firm—Poms, Smith, Lande & Rose

[57] ABSTRACT

Disclosed herein is an improved passive ring laser gyroscope with two systems: common mode and differential mode error systems. The common mode error system modulates counter propagating coherent radiation. The modulated light from a common source is split at a beam splitter before the reasonator cavity and then optically recombined at the same beam splitter for further propagation to an electronic detecting and demodulation servo system. The resulting electronic error signal is used to adjust the ring resonator and the laser so that the frequency output of the coherent radiation of the laser is substantially equal to the resonance frequency of the ring resonator. The differential mode error system optically substracts counter propagating radiation signals emanating from the resonator cavity to form a differential error signal that is detectable by an electronic detector for further processing by demodulation. This output signal is used to servo and drive acousto-optic modulating frequency shifters, one for each counter propagating radiation of the ring resonator. The difference between the frequencies at which the acousto-optic modulators are driven is made equal to the difference between the frequencies of the counter propagating radiation of the ring resonator. In this manner a reading of the difference of the frequencies driving the two acousto-optical modulators provides a beat signal which is directly translatable to a reading indicating the rate of rotation of the gyroscope.

10 Claims, 3 Drawing Sheets

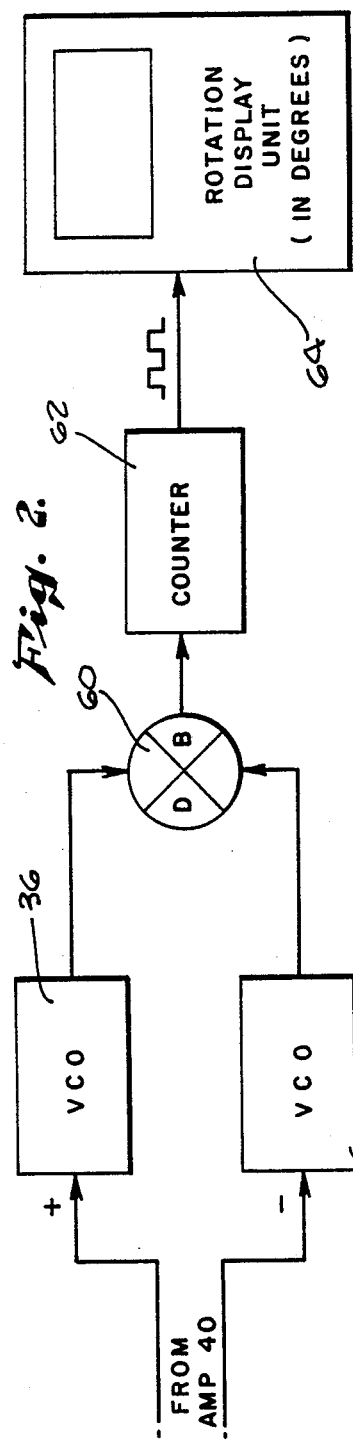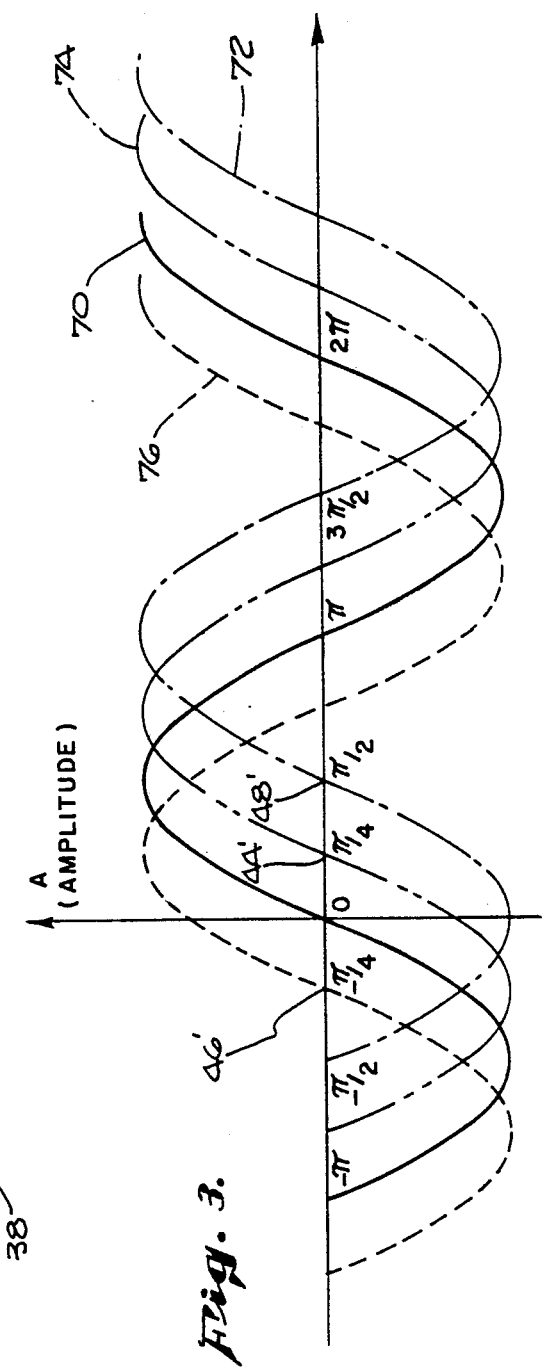
Fig. 2.
Fig. 3.

OPTICALLY DIFFERENTIATING AND ADDING PASSIVE RING LASER GYROSCOPE

FIELD OF THE INVENTION

This invention relates to ring laser gyroscopes and, in particular, to an improved passive ring laser gyroscope.

BACKGROUND OF THE INVENTION

A passive ring laser gyroscope has an optical resonator cavity, usually in the form of a rectangle or a triangle, into which coherent light is introduced from an external laser source. An active ring laser gyroscope uses a gain-medium within a similar resonator cavity with a laser created therein.

Active ring laser gyroscopes are subject to problems of mode lock-in, bias drift due, for example, to gas flow, and other medium-related problems. These problems degrade the accuracy and precision of an active ring laser gyroscope. A passive ring laser gyroscope has been seen as an alternative to the active ring laser gyroscope as it has fewer problems.

Examples of passive ring laser gyroscopes include U.S. Pat. No. 4,135,822 by S. Ezekiel issued Jan. 23, 1979. The subject matter of this patent was also disclosed in an article: Ezekiel, S. and Balsamo, S. R. "Passive Ring Resonator Laser Gyroscope," *Applied Physics Letters* Vol. 30, No. 9, May 1977, pp. 478–480. The passive ring laser gyroscope described in the patent and the article uses a ring resonator with three or more mirrors as a rotation sensing element. An external laser is used to probe the resonator to determine the difference between the clockwise and anticlockwise cavity resonant frequencies. The difference arises from rotation of the cavity relative to the local inertial reference frame. The frequencies of the clockwise and counterclockwise travelling beams are maintained at their resonance frequencies by means of an electronic control system.

If two lasers are used, each is maintained at its respective cavity resonance frequency. In gyros utilizing a single source laser, the beam is split into two beams before being injected into the resonator cavity in the two directions. The frequency of each beam is independently controlled by acousto-optical devices, each driven by separate voltage-controlled oscillators (VCO). The shifted frequency beams exit the resonator cavity where two detectors are used to detect the respective frequency differences between the light beams and the cavity resonance frequencies. That is, one detector detects the frequency difference between the light travelling in the clockwise direction and the clockwise cavity resonance frequency. The other detector detects the frequency difference between the light travelling in the counterclockwise direction and the counterclockwise cavity resonance frequency. These two error signals are subtracted electronically providing a differential error signal which is proportional to the difference between the difference in optical frequencies and the difference in cavity resonance frequencies in opposing directions. The differential error signal is amplified and fed back for servo-control of a VCO which shifts the frequency of one of the counter rotating light beams. This electronic error balancing and feedback system of the prior art necessarily introduces electronic noise into the system. Problems of matching photodetectors make it difficult to achieve the stability needed to accurately measure rotation using a passive ring laser gyro design.

In a second article: Drever, R. W. P., Hall, J. L. and Kowalski, F. V., "Laser Phase and Frequency Stabilization Using Optical Resonator," *Applied Physics B*, Vol. 31, 1983, pp. 97–105, the authors disclose an optical frequency stabilization system which has an optical frequency discriminator and laser stabilization feedback configuration to achieve a longitudinal cavity resonator frequency which is substantially the same frequency as the coherent light source used in the system. In the Drever, et al. article, phase-modulated optical sidebands are applied to (or superimposed on) the carrier optical wave in order to measure the extent of adjustment of the resonator that is required to match its resonant frequency to the laser source frequency. A sole detector is used to detect the optical signal that, upon demodulation, provides an electronic error signal which can be electronically fed back to adjust the optical frequency of the laser so as to match that of the resonant cavity as determined by its length. This optically stabilized laser system has been operated only to achieve laser stabilization of a single laser frequency to a single cavity mode resonance frequency. It has not been operated to produce a differential signal detection and to derive a beat frequency indicative of rotation, as described by Ezekiel.

The electronics in the first of the prior art systems described above produce noise sources that limit the accuracy and precision of detected error signals and, thus, the beat frequency output needed to ascertain gyroscopic inertial rotation.

SUMMARY OF THE INVENTION

The improved passive ring laser gyroscope of this invention comprises a ring resonator cavity for receiving coherent light. The resonator cavity has two independent resonant frequencies, one for light injected clockwise and the other for light injected anticlockwise. Generally, a resonator cavity is made from three or more highly reflective mirrors, one of which is partially transparent to allow light to enter the cavity and to escape therefrom.

The passive ring laser gyroscope of this invention is a combination of two subsystems: a differential mode and a common mode.

The first subsystem is directed to a means for deriving a differential error signal which is proportional to the difference between the resonant frequencies of the clockwise and counterclockwise mode of the ring resonator cavity and the difference between the frequencies of the clockwise and counterclockwise radiation fields incident upon and recirculating within the resonant cavity. The resonant frequencies differ by an amount proportional to the rotation rate of the device. The light is used to probe the system and measure this difference frequency. When operating properly, the difference between the optical radiation frequencies is substantially the same as the difference between the resonant frequencies of the cavity and the differential mode error signal is always zero. The rotation rate of the system is then determined by the beat frequency of the two optical signals. The differential error detector and modulating subsystem includes a means for modulating the counter-propagating components of the radiation. This modulating means is operatively associated with the resonator cavity. The subsystem for feeding back and eliminating the differential error signal includes a frequency shifting means for independently controlling the frequencies of the counter-propagating radiation components in a manner dependent upon their direction of propagation within the resonator cavity. For example, the frequencies of both counter-propagating beams are upshifted (or downshifted) but by different amounts so that the clockwise propagating component of radiation within the resonator cavity may be frequency upshifted, while the counterclockwise propagating radiation in the resonator cavity may also be frequency upshifted but to a frequency higher or lower than the first.

The optical signals are derived in the following way: The incident beam is split in two by the beam splitter. Each radiation component is subsequently frequency shifted and phase modulated before impinging upon the cavity input mirror. A large fraction of each radiation component is recirculated within the ring resonator at very near the resonant frequency of the corresponding cavity mode. Some fraction of the recirculating radiation field leaks out of the cavity through the input mirror. This radiation field combines with the light that is reflected from the input mirror and results in an optical phase shift of the reflected component. This optical phase shift contains the information relating the frequency of the input beam to the frequency of the resonator cavity. The sidebands applied by the phase modulators allow for the detection of the direction of the optical phase shift. The two radiation fields, after exiting the resonator, are phase modulated and frequency shifted again before returning to the beam splitter. At the beam splitter, they are optically recombined into two beams. The effect of the beam splitter is to generate the difference and sum of the optical signals and hence the difference and sum of the error signals in each of the two directions of the propagating waves. The differential signal or "optically subtracted" signal exits the remaining port of the beam splitter and generates the differential mode error signal. The summed signal or "optically added" signal returns in the direction from whence the original beam came and gives rise to the common mode error signal.

The optical signals from the beam splitter are amplitude modulated and can be observed by electronic detectors. The detectors generate high frequency electronic signals which, when demodulated by a double-balanced mixer, for example, generate the desired direct current error signals.

The differential mode error signal and common mode error signal are each measured by the use of a single detector. Thus, there is no matching of detectors necessary. The information from the differential mode error signal is fed back to the frequency shifting means for purposes of control.

The second subsystem adds the counter-propagated beams. The counter-propagating radiation components derive a common mode optical error signal which must be picked off as it travels in a direction opposite the direction of the input laser beam. This signal is detected, demodulated and fed back to the laser or the resonator cavity or both so that the laser radiation is frequency stabilized with respect to the resonator cavity.

BRIEF DESCRIPTION OF THE DRAWINGS

Other aspects of the invention will become apparent by reference to the accompanying description of the drawings and detailed description of the preferred embodiment, wherein:

FIG. 2 shows the subsystem components, in block diagram form, useful in deriving an output signal from the system shown in FIG. 1 which is directly useful in displaying the amount of rotation which the ring resonator cavity undergoes;

FIG. 3 is a graphic diagram of amplitude versus time showing how the phase shifters of FIG. 1 operate.

DETAILED DESCRIPTION OF THE PREFERRED EMBODIMENT

Figure 1:
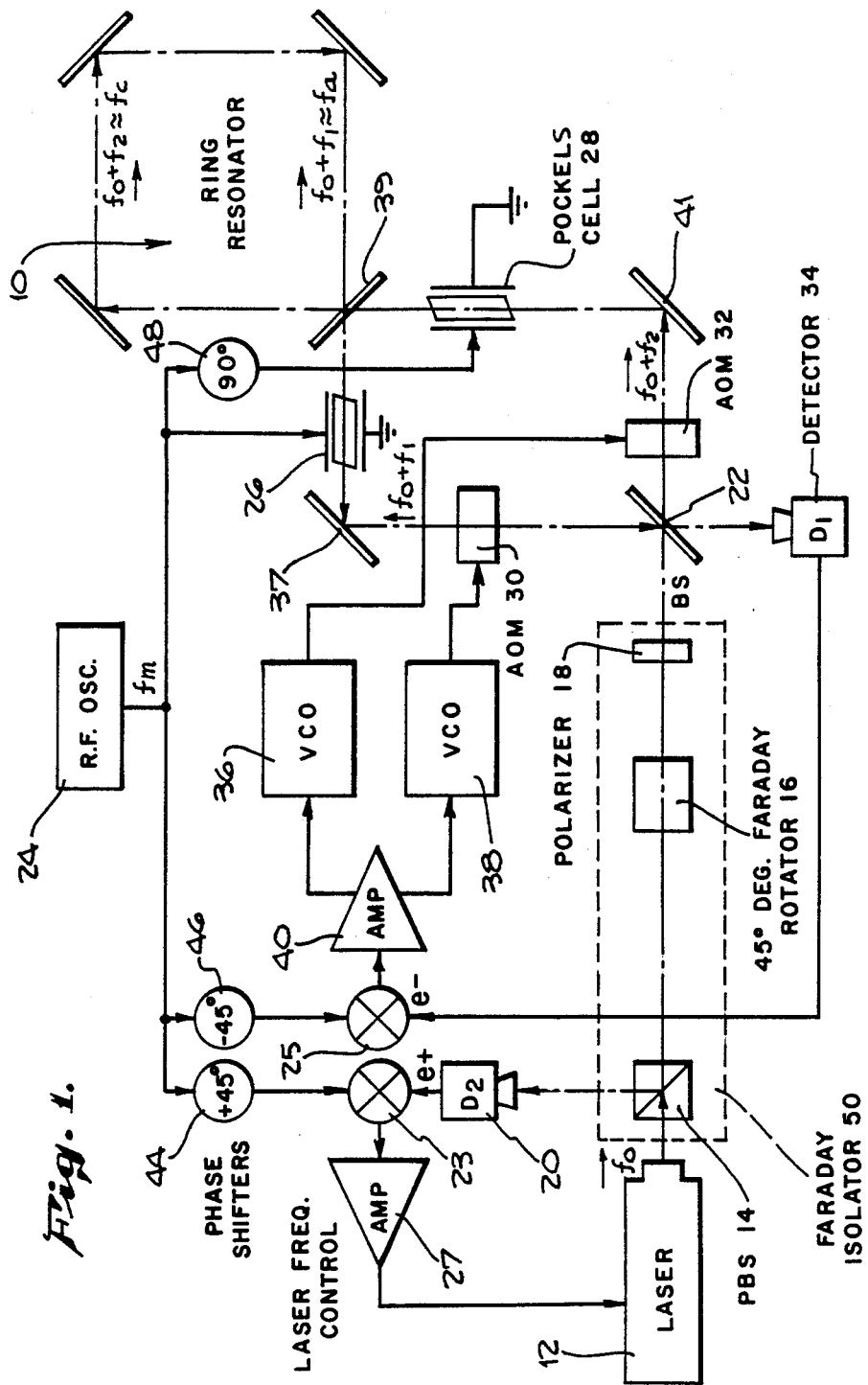
FIG. 1 is a schematic block diagram of one embodiment of the passive ring laser gyroscope system of this invention.

With reference to FIG. 1, a schematic block diagram of an improved passive ring laser gyroscope is shown. The electro-optical system of this invention may be divided into two subsystems: one which processes the differential mode error signal (e−) and one which processes the common mode error signal (e+). The major optical components of the overall passive laser gyroscope system shown in FIG. 1 include: a source laser 12 (operating at a frequency $f_0$), a resonator cavity 10, a Faraday isolator 50, electro-optic modulators (EOMs or Pockels cells 26 and 28) and acousto-optical modulators (AOMs 30 and 32). The significant electronic components of the system include: voltage controlled oscillators (VCOs 36 and 38), photodetectors 20 and 34, mixers 23 and 25, a resonator cavity piezo-amplifier 27 associated with a piezo drive (not shown) which servos the laser 12, and a difference amplifier 40 which drives the VCOs 36 and 38.

Useful in understanding the concepts of this invention are the following frequency terms: $f_0$, $f_1$, $f_2$, $f_a$, $f_c$ and $f_m$. These terms are defined as follows:

$f_0$ = frequency of laser 12;

$f_1$ = frequency of anticlockwise V.C.O. 38 and extent to which the anticlockwise laser beam is frequency upshifted at AOM 30 before impinging upon the resonator 10;

$f_2$ = frequency of clockwise V.C.O. 36 and extent to which the clockwise laser beam is frequency upshifted at AOM 32 before impinging upon the resonator 10;

$f_a$ = anticlockwise resonator cavity frequency;

$f_c$ = clockwise resonator cavity frequency; and $f_m$ = reference frequency from frequency oscillator 24.

Using these terms, the common mode error signal e+ is proportional to:

$$2f_0 + f_1 + f_2 - f_a - f_c;$$

and the differential mode error signal e− is proportional to:

$$f_1 - f_2 - (f_c - f_a).$$

The beat frequency of the passive laser gyroscope is:

$$f_1 - f_2;$$

and the gyroscope is properly working when:

$$f_1 = f_2 = f_c - f_a.$$

The passive ring laser gyroscope of this invention operates by stabilizing an injected laser beam (having a frequency $f_0$) to the clockwise and anticlockwise resonant frequencies ($f_c$ and $f_a$, respectively) of a longitudinal mode of the resonator cavity 10. Rotational information is obtained from the beat frequency derived by rotation of the plane of the resonator cavity 10 about an axis perpendicular to the plane of the cavity 10. This method of deriving a beat frequency is similar to that of an active ring laser gyroscope. Unlike an active mode ring laser gyroscope, the passive ring laser gyroscope of this invention is less subject to problems with respect to the laser medium or phase lock-in of signals. Since the laser 12 is external to the ring resonator 10, the ring laser gyro system of this invention eliminates gain medium related errors. It is designed to maintain the sum of the frequency of the laser and the average frequency of the acousto-optic frequency shifters 30 and 32 equal to the average of the two resonant frequencies of the resonator cavity ($f_a$ and $f_c$).

The laser 12 provides an output of coherent radiation at a frequency of $f_0$ which is directed through the Faraday isolator 50 to a beam splitter 22. The Faraday isolator 50 is comprised of a polarizing beam splitter 14, a 45° Faraday rotator 16, and a polarizer 18. A Faraday rotator is a device containing an optical medium that exhibits an effect known as the Faraday effect when in the presence of a magnetic field. The effect is to rotate the polarization of the optical beam about its axis of propagation in a sense determined by the applied magnetic field. In this way a beam passing through a 45° Faraday rotator may have its polarization rotated clockwise 45° by the time it exits the rotator. If, however, the beam is reflected back through the rotator in the opposite direction, the polarization will be rotated again in the same director to 90°. The net result is that the counter-propagating beams will then have orthogonal polarizations compared to the output from the laser. This protects the laser from returning light beams by allowing one beam to pass and diverting the other.

Light from isolator 50 which passes through the beam splitter 22 is split into two beams of approximately equal power in both directions of a bidirectional pathway. The reflected beam passes through the acousto-optic modulator 30 shifting its frequency to $f_0+f_1$ ($f_1$ is the frequency induced by the anticlockwise V.C.O. 38). The beam then reflects from a mirror 37, after which it passes through an electrooptic modulator 26 where it is phase modulated at a frequency ($f_m$) from oscillator 24. The laser beam then passes through an entrance mirror 39 of the resonator cavity 10, where the light is directed around the resonator in an anticlockwise direction.

Similarly, light from the laser 12 also passes through beam splitter 22 after passing through the Faraday isolator 50. This beam is then directed through the acousto-optic modulator 32 shifting the beam frequency to $f_0+f_2$ ($f_2$ is the frequency induced by the clockwise V.C.O. 36). The beam is then reflected from a mirror 41 to the entrance mirror 39 of the resonator 10 after optical phase modulation in the electro-optic modulator 28. This beam is directed around the resonator 10 in a clockwise direction.

The clockwise and anticlockwise modes of the laser beam, split by the beam spitter 22, are subjected to a phase shift of 90°, one with respect to the other, as a result of phase shifter 48. The electro-optic modulators 26 and 28 are driven by the radio frequency oscillator 24 at a frequency ($f_m$) which, in the preferred embodiment, is 12 MHz (megahertz).

Thus, just before entering the resonator cavity 10, each optical beam, modulated by the electro-optic modulators 26 and 28, is composed of a central carrier frequency ($f_0+f_1$, $f_0+f_2$) in the optical range (THz) with first order sidebands situated above and below the carrier frequency by the amount $f_m$ (the radio frequency range). However, the ring resonator 10 is tuned to resonate or recirculate a frequency close to those of the carrier frequencies ($f_0+f_1$, $f_0+f_2$). Thus only light energy at the carrier frequency components resonates and so builds up within the cavity to provide a high amplitude sharply tuned signal. The sidebands are to a large part reflected, without a substantial phase shift.

Where the frequency of laser 12 differs slightly from the frequency of cavity 10, some fractions of the carrier frequency components are reflected from the entrance mirror 39 and have optical phase shifts proportional in both sign and magnitude to the frequency error present in the system, i.e., proportional to: $f_0+f_1-f_a$ and $f_0+f_2-f_c$ ($f_a$ is the anticlockwise cavity frequency and $f_c$ is the clockwise cavity frequency). The error signals present in this system may be defined as (ea) which is equal to the difference of the frequency of the anticlockwise injected laser beam and the resonant frequency for the anticlockwise wave within the resonator 10 (ea=$f_0+f_1-f_a$). Likewise an error signal (ec) is equal to the difference between the frequency of the clockwise injected beam from the laser 12 and the resonant frequency for the clockwise wave present in the ring resonator 10 (ec=$f_0+f_2-f_c$).

The sum of the error signals, also known as the common mode error signal, is defined as e+ equal to ea+ec. A differential mode error signal is defined as e− equal to ea−ec. During initialization of the system, or in the event of external noise, such as vibrations, the error signal e+ will not have a value of zero and will thus indicate that the frequency of the average frequency of the injected beams $$f_0 + \frac{f_1 + f_2}{2}$$

is different from the average frequency of the resonant frequencies of the ring resonator cavity 10 (($f_c+f_a$)/2). In order to achieve laser stabilization, the common mode error signal must be reduced and maintained very close to zero thus ensuring that the average input beam frequency is almost identical to the average resonant frequency of the cavity. The laser 12 is said to be stabilized when the above requirements are met. In order to determine whether the laser 12 has been stabilized to operate at the frequency $f_0$, its light must be sensed, analyzed, and processed to adjust the laser 12 to meet these common mode requirements of the system.

As has been noted, the laser light, operated at a frequency of $f_0$, is modulated plus or minus $f_m$ by each of the electro-optic modulators 26 and 28. As light emerges from the ring resonator 10 through the mirror 39, it then passes back through the light path and through the electro-optic modulators 26 and 28, the acousto-optical modulators 30 and 32, and on to the beam splitter 22, where the modulated beam is split into two paths; one is directed back through the Faraday isolator 50 to the polarizing beam splitter 14, which diverts it to the common mode detector 20. The Faraday isolator 50 as shown in FIG. 1, provides separate pathways for forward and backward travelling beams due to polarization, as stated above.

Since light approaching the entrance mirror 39 of the ring resonator 10 has been modulated by the electro-optic modulators 26 and 28, it has several frequency components. Only those of the carrier are in resonance with the cavity frequencies. Thus, the sideband components and a portion of the carrier frequency components are reflected from the entrance mirror 39 and travel back towards the beam splitter 22. The reflected beams are recombined at the beam splitter 22, and their sum and difference are detected by the detectors 20 and 34, respectively.

With reference to the common mode stabilization subsystem (e+), the recombined light from the beam splitter passes back through the Faraday isolator 50 where it is detected by the detector 20. The detector 20 is tuned to a narrow bandwidth having as its center frequency $f_m$. In the preferred embodiment $f_m$ is 12 MHz. The detector converts this modulated sideband dominated light beam to an electrical signal which is presented to a heterodyning mixer 23, for mixing with a local oscillator signal from the radio frequency oscillator 24 that had been phase shifted a positive 45° by a phase shifter 44. The resulting demodulated signal from the mixer 23 is presented to an amplifier 27 as a low frequency error signal which is then used to servo and adjust the laser 12 to stabilize the source laser with respect to the average of the two resonant frequencies.

The servo system operates in two stages in the preferred embodiment. The length of resonator cavity 10 is adjusted via piezo transducers (not shown) to accommodate D.C. to mid-band frequency noise. High frequency error signals are fed back to laser 12 as a laser control current shown as the arrow output from amplifier 27. In the event a diode laser source is used for laser 12, an alternative, but substantially similar, servo mechanism will accommodate the need for common mode stabilization.

Accompanying the common mode stabilization subsystem of the passive ring laser gyroscope of this invention, is the differential mode subsystem (e−) that is used to detect the amount of rotation experienced by the resonator cavity 10. To control the frequency difference between the clockwise and anticlockwise longitudinal modes of the resonator cavity 10, a pair of the differentially driven acousto-optic frequency shifting modulators 30 and 32 independently adjust the frequencies of the two optical signals.

Both modulators 30 and 32 frequency upshift the optical frequency ($f_0$). AOM 30 upshifts the optical carrier frequency by 80 MHz plus half the resonant frequency difference ($f_0+f_1$), while the other AOM 32 upshifts the frequency by 80 MHz minus half the resonance frequency difference ($f_0+f_2$). As each beam exits the resonator cavity 10 and passes back through each modulator 30 and 32, the frequency of the light beams are each upshifted. Therefore, by the time the beams from the resonator are recombined at the beam splitter 22, both beams have been upshifted precisely 160 MHz and again have the same frequency. This return beam is substantially upshifted in relation to the input frequency $f_0$ so that the return beam does not disrupt the stability of the source laser 12.

If the AOM 30 is driven at a frequency $f_1$ by the VCO 38, then, the error signal (ea) in the anticlockwise direction within the ring resonator 10 would be equal to $f_0+f_1-f_a$. Similarly, $ec=f_0+f_2-f_c$. A differential mode error signal (e−) detected by detector 34 which is equal to (ea−ec). Differential stabilization is achieved by feedback of this differential error signal e−. This optical signal is detected by detector 34, and demodulated at mixer 25 by the local oscillator signal $f_m$ that is phase shifted at shifter (46), generating the differential error signal. The differential error signal e− is amplified at 40 and fed back to the AOMs 30 and 32 via the VCOs 36 and 38. When, e− or (ea−ec)=0, at differentially equalized conditions, then, $f_1-f_2=f_c-f_a$.

That is, when the differential mode is properly stabilized, the frequency difference between the clockwise and counterclockwise longitudinal modes within the ring resonator 10 is equal to the difference between the output drive frequencies of VCO 38 ($f_1$) minus the output drive frequency of VCO 36 ($f_2$). This output beat frequency may be obtained by mixing the output of the two voltage controlled oscillators 36 and 38 (as shown in FIG. 2), at a doubly balanced mixer 60 connected to a counter 62 to produce a measure of the rotation rate of the system at a rotation display unit 64. The display unit 64 shows, in appropriate units, for example degrees, the amount of rotation that the passive ring laser gyro system experiences.

The differential signal analyzer subsystem herein disclosed obviates the need for mechanical dither and allows rotational measurement through a use of an external laser 12 for an improved passive gyroscope system. Unlike the prior art processing, subtraction and addition of the counter propagating beams within the resonator cavity 10 are optically combined at the beam splitter 22. A modulated and frequency shifted optical differential signal is then presented to the detector 34. Optical detection of the optical differential error signal by the detector 34 allows for the measurement of angular rotation without an electronic subtraction of error signals.

Errors were introduced in the prior art where the counter propagating optical modes were separately detected and combined electronically at a difference amplifier to achieve a difference error signal. The process introduced excessive noise in the system. Since the differential error signal effects the beat frequency directly and its servo-loop performance is absolutely critical, the use of a single loop and optical subtraction to achieve measurement and adjustment of the differential mode error signal is a significant development.

The system described herein phase shifts the reference frequency ($f_m$) from the frequency oscillator 24, as shown on FIG. 3. Sinewave 70 represents the frequency $f_m$ with no phase shift added. Sinewave 72 in FIG. 3 shows the phase shift achieved by 90° phase shifter 48 at 48'; sinewave 74 shows the plus 45° phase shift achieved by phase shifter 44 at 44'. Finally, phase shifter 46 has the effect of a minus 45° phase shift at 46'. From viewing FIG. 3 it can be seen that if one were to add sinewaves 70 and 72 along their entire length, this addition would result in the production of sine curve 74. Likewise if one were to subtract curve 70 from 72, the resulting curve would appear as the sinewave pattern 76. The phase shifters 44, 46 and 48 (FIG. 1) are used to provide relative phases of modulation suitable to optimize the control signals. The various phase shifters (44, 46, and 48) are used to impose proper modulation so that each detector receives an appropriate signal. In the preferred embodiment, all needed RF phase shifts are obtained by employing appropriate lengths of coaxial cable.

Figure 4:
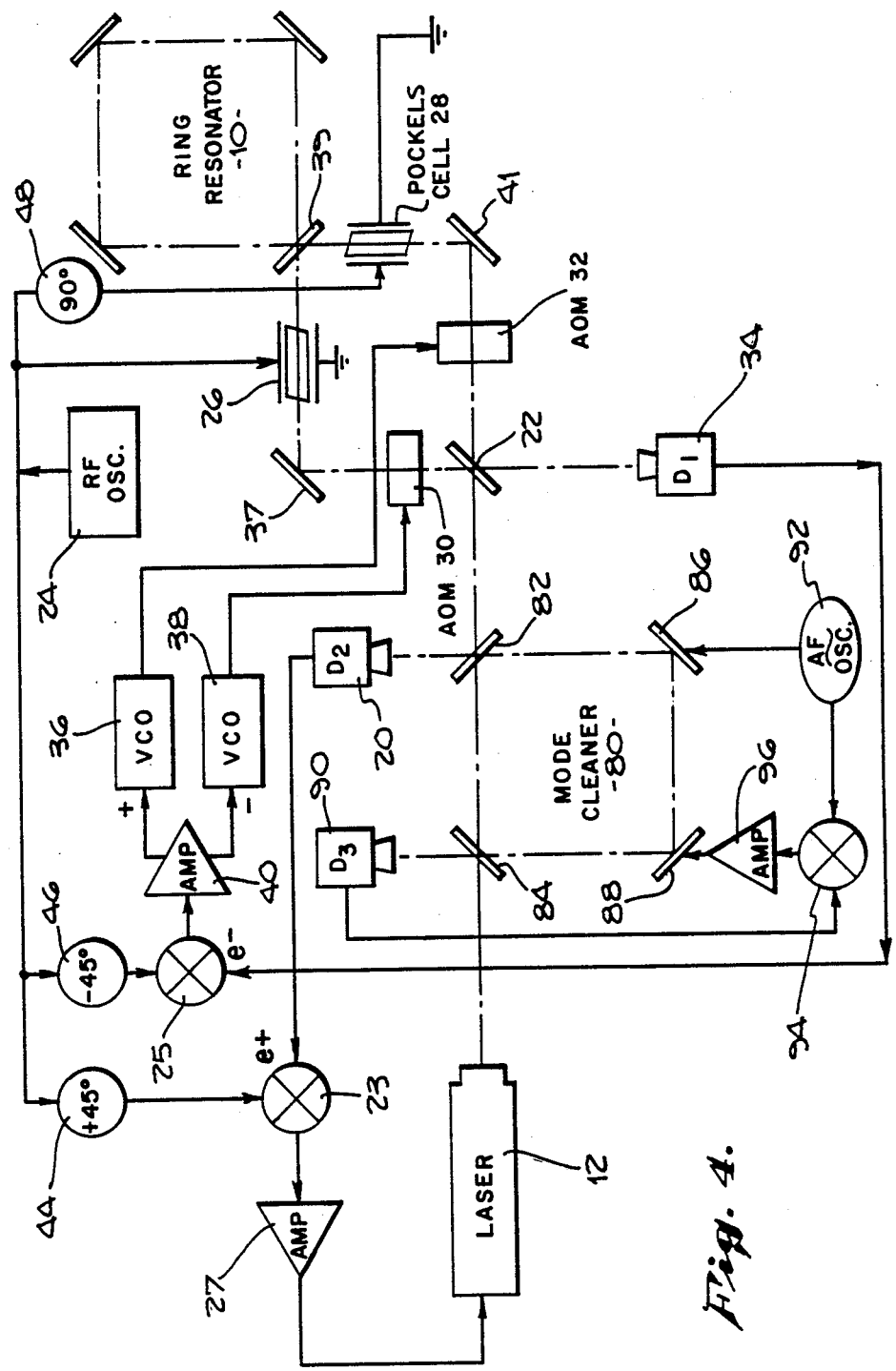
FIG. 4 is another embodiment of the passive ring laser gyroscope system of this invention which includes a mode cleaner.

An alternative embodiment for the passive laser gyroscope of this invention is shown in FIG. 4 wherein many of the components of FIG. 1 are shown with the same reference numbers. A mode cleaner 80 is provided for optical isolation, rather than the Faraday isolator 50 of FIG. 1. In this alternative embodiment, the source laser 12 may be injected in only one direction of the ring 80. The ring is kept at resonance by a servomechanism. The light that returns from the resonator cavity 10 after being recombined at the beam splitter 22 is shifted in frequency 160 MHz by the AOMs 30 and 32. Therefore, this light is not in resonance with the small ring of the mode cleaner 80 and will be deflected into the common mode detector 20. At least one of the mirrors of the mode cleaner cavity 80 is mounted on a piezoelectric material, such as mirrors 86 and 88. The mode cleaner 80 is frequency locked to the source laser 12 by means of a dither technique. The mirror 86 is driven by an audio frequency (AF) oscillator 92. The other mirror 88 is servoed via a mixer 94 and amplifier 94 to maintain maximum optical transmission of the resonator 10. Such a geometry lends itself to miniaturization more easily than the Faraday isolator 50.

While the preferred embodiment of this invention has been shown, it is understood that the common mode error system and the differential mode error system may be designed as separate circuits. Further, the ring resonator cavity 10 is but one version of a resonator system. Alternatively, light may be directed along different pathways within a fiber optic system using fiber optics to direct propagation of the beams.

What is claimed is:

1. An improved passive ring laser gyroscope, having an external source of coherent radiation, comprising:
   an optical splitter which receives said coherent radiation to produce counter-propagating radiation components;
   means for frequency shifting said radiation components in a manner dependant upon their direction of propagation;
   means for phase modulating said frequency shifted radiation components;
   a resonator cavity for receiving said frequency shifted and phase modulated, counter-propagating radiation components; and
   said optical splitter receiving said frequency shifted and phase modulated, counter-propagating radiation components from said resonator cavity and optically adding and subtracting said radiation components to create a modulated, common mode error optical signal and a modulated, differential mode error optical signal.

2. The improved passive ring laser gyroscope of claim 1, additionally comprising:
   a detector for receiving said modulated, common mode error beam of radiation to generate a modulated, common mode error signal;
   a demodulator for receiving said modulated, common mode error signal for demodulating said common mode signal; and
   an amplifier for receiving said common mode signal whose output adjusts the frequency of said source of coherent radiation.

3. The improved passive ring laser gyroscope of claim 1, additionally comprising:
   a detector for receiving said modulated, differential mode error beam of radiation to generate a modulated differential mode error signal;
   a demodulator for receiving said modulated differential mode error signal for demodulating said differential mode signal; and
   an amplifier for receiving said differential mode signal whose output adjusts said means for frequency shifting said radiation components.

4. The improved passive ring laser gyroscope of claim 1, wherein:
   said means for frequency shifting said radiation components are acousto-optic modulators.

5. The improved passive ring laser gyroscope of claim 1, wherein:
   said means for phase modulating said radiation components are electro-optic modulators.

6. The improved passive ring laser gyroscope of claim 5, additionally comprising:
   an oscillator for driving said electro-optic modulators to provide a modulating frequency thereto.

7. The improved passive ring laser gyroscope of claim 3, additionally comprising:
   a pair of voltage controlled oscillators connected to said amplifier for receiving said differential mode signal;
   said voltage controlled oscillators connected to said means for phase modulating said radiation components to adjust said phase modulation in proportion to said differential mode signal.

8. The improved passive ring laser gyroscope of claim 7, additionally comprising:
   a mixer for receiving the output signal from said pair of voltage controlled oscillators; and
   an indicator connected to said mixer to receive a signal therefrom to indicate the rate of rotation of said gyroscope.

9. An improved passive ring laser gyroscope, having an external source of coherent radiation, comprising:
   means for producing counter-propagating radiation components;
   a resonator cavity for receiving said counter-propagating radiation components;
   means for frequency shifting said radiation components in a manner which depends upon their direction of propagation within said resonator cavity;
   means for phase modulating said radiation components operatively associated with said resonator cavity;
   said means for producing said counter-propagating radiation further receiving and optically subtracting said frequency shifted, counter-propagating radiation components from one another to derive a modulated optical differential mode error signal;
   means of detecting said modulated optical differential mode error signal to derive a modulated electronic differential mode error signal;
   means for demodulating said modulated electronic differential mode error signal which provide feedback signals to said frequency shifting means; and
   means to measure a frequency difference between said feedback signals and thereby measure the rate of rotation of said gyroscope.

10. An improved passive ring laser gyroscope, having an external source of coherent radiation, comprising:
    means for producing counter-propagating radiation components;
    a resonator cavity for receiving said counter-propagating radiation components;

means for frequency shifting said radiation components in a manner which depends upon their direction of propagation within said cavity;

means for phase modulating said radiation components operatively associated with said resonator cavity;

said means for producing said counter-propagating radiation further receiving and optically adding said frequency-shifted, counter-propagating radiation components to one another to derive a modulated optical common mode error signal;

means of detecting said modulated optical common mode error signal to derive a modulated electronic common mode error signal;

means for demodulating said modulated electronic common mode error signal which provide feedback signals to said resonator cavity, radiation source or both; and means for feeding back said feedback signals such that said external source of coherent radiation is stabilized with respect to said resonator cavity.

* * * * *